No. 628,742. Patented July 11, 1899.
W. A. VAN BERKEL.
MACHINE FOR SLICING GERMAN SAUSAGES, &c.
(Application filed Apr. 5, 1898.)
(No Model.) 2 Sheets—Sheet 1.
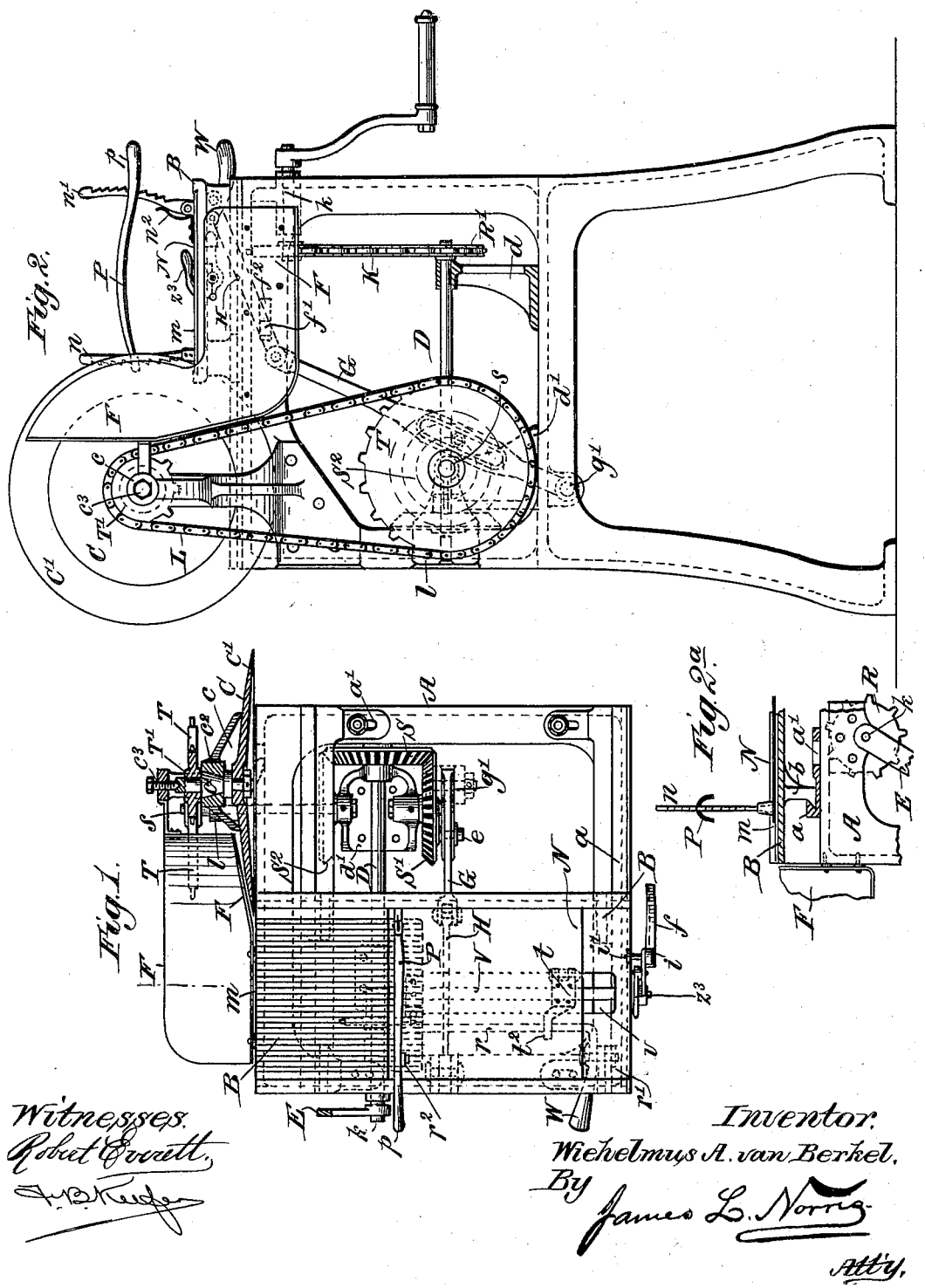
Witnesses.
Robert Everett
Inventor.
Wiehelmus A. van Berkel,
By James L. Norris
Att'y.

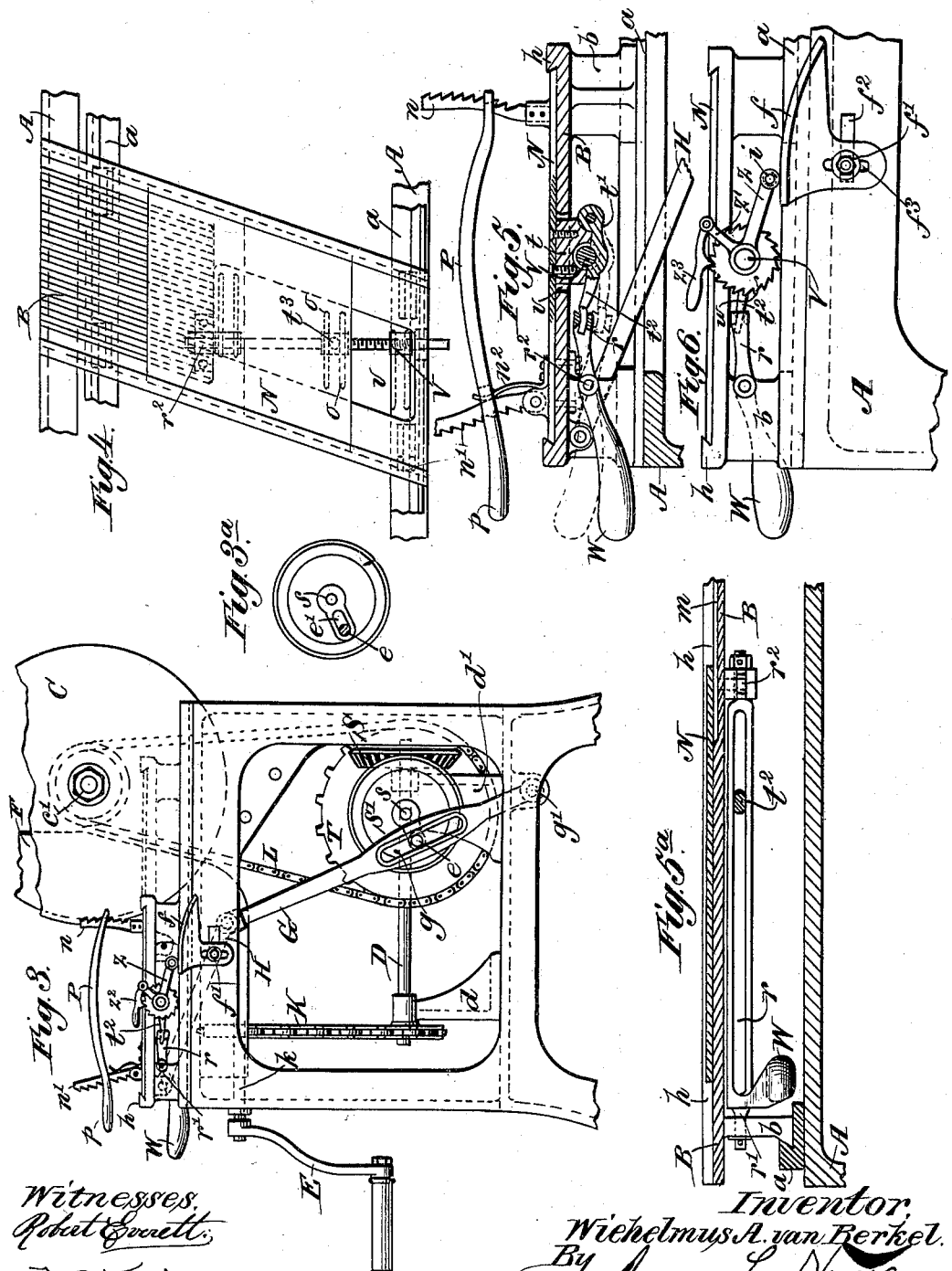

UNITED STATES PATENT OFFICE.

WILHELMUS ADRIANUS VAN BERKEL, OF ROTTERDAM, NETHERLANDS.

MACHINE FOR SLICING GERMAN SAUSAGES, &c.

SPECIFICATION forming part of Letters Patent No. 628,742, dated July 11, 1899.

Application filed April 5, 1898. Serial No. 676,561. (No model.)

*To all whom it may concern:*

Be it known that I, WILHELMUS ADRIANUS VAN BERKEL, manufacturer, a subject of the Queen of the Netherlands, and a resident of Rotterdam, in the Kingdom of the Netherlands, have invented certain new and useful Improvements in Machines for Slicing German Sausages and the Like, of which the following is a specification.

This invention has for its object a machine for slicing German sausages and the like meat goods in which a fixed, but constantly-rotating, circular knife of spherical or dished form is arranged for cutting the sausages.

The lengths of cutting by the circular knife are determined by its speed of rotation and are larger according as the speed of rotation of the knife is increased corresponding to the meat goods to be sliced or cut. The table on which the sausage or the like is clamped is evenly moved along toward the edge of said rotating circular knife slowly while a slice is being cut off from the sausage, but returned rapidly after the cut. In the time that the table is moving back the sausage is pushed forward on the table to the width of a slice, and this adjustment takes place automatically, and the machine may be adjusted to all kinds of meat goods which must be cut thicker or thinner. The length of the to-and-fro movement of the table may also be regulated to correspond to the size of the polony to be sliced in order that the travel of the table shall not be larger than the width of the piece of meat and no time be lost.

The cutting-machine according to this invention removes all the defects and drawbacks of the cutting-machines hitherto known. In these machines the table is as a rule fixed and the knife adjustably arranged; also the lengths of cutting are measured too short, so that the knife presses more than cuts. This pressing of the slices is also caused by the whole width of the existing knife being in contact with the piece of meat during the cutting, whereby friction is considerably increased. The knives also do not invariably move exactly in a straight line, and all these mentioned drawbacks tend to produce the undesirable so-called "slipping" of the knife and the cutting of slices of unequal thickness.

My circular knife has, however, a spherical or dished form, so that only the knife-edge comes in contact with the piece of meat. The circular knife revolves precisely in a straight line, so that disks or slices mathematically of equal thickness are cut off and slipping of the knife can no longer take place. A further advantage is that the circular knife can be ground on the slicing-machine itself and also that all sizes of meat goods or polonies may be cut transversely or obliquely. Several pieces may be sliced simultaneously on the same machine up to the last piece, which hitherto had always to be done by hand.

The improved slicing-machine is shown in various views in the accompanying drawings, in which—

Figure 1 is a plan view; Fig. 2 a front view, and Fig. 3 a rear view. Fig. 4 is a plan of a table arranged obliquely to the circular knife. Figs. $2^a$ and $3^a$ are details of the slicing-machine. Figs. 5, $5^a$, and 6 are respectively a vertical cross-section, longitudinal section, and rear elevation of the movable table on an enlarged scale, showing also the mechanism for moving the polony and the device for releasing the same.

A table B for the polonies or the like which are to be sliced is arranged on a rectangular table-frame A in a dovetail groove or slide-track $a$ by means of two slide-carriages $b$, movable in a transverse direction. At the side in front of the table a circular knife C is mounted in a bearing frame or support $c$ on the table-frame and with its cutting edge C' as close as possible to the front edge of the movable table B. The circular knife is mounted on the end of a shaft $c'$, which revolves on a cone-bearing $c^2$ and has at its other end a chain-wheel F', Figs. 1 and 2. The shaft $c'$ is also adjustable in the cone-bearings $c^2$ by means of set-screws $c^3$. The rotation of the circular knife C and the movement of the table B up to and along the knife take place from a main shaft D, which is arranged in suitable bearings or supports $d\ d$ on the table-frame. As may be seen in Figs. 1, 2, and 3, this main shaft is operated by a chain K, carried over a chain-wheel R on the shaft $k$ of a hand-crank E and over a chain-wheel R' on the said main shaft D, the latter being placed too low to be directly mounted on the hand-crank shaft. On the other end the main shaft D carries a bevel-wheel S, which engages with two bevel-wheels S' S², mounted one on each side in a bearing-support $d'$ and arranged at right angles to the first wheel. One of these latter bevel-wheels, S', produces the movement of the table B and the other, S², the rotation of the circular knife C by means of the shaft $s$ of the latter bevel-wheel, which at the other end carries a large chain-wheel T, which by means of a chain L drives a smaller chain-wheel T' on the shaft of the circular knife. The bearing-support $l$ for this end of the bevel-wheel shaft $s$ is screwed to the table-frame. The speed of rotation of the circular knife is considerably increased by the adoption of a suitable ratio of transfer for the chain-wheel gearing, and it is possible by the insertion of a larger or smaller chain-wheel T' to vary the speed according to requirements. By the spherical or dished form of the circular knife the cutting edge C' in cutting off a slice from the polony or the like will throw the piece cut off from the latter into an open collecting-box or receiver F. This collecting-box is placed as close as possible to the movable table B and the revolving knife C. Its form is suited to that of the circular knife, and it is attached both to the table-frame A and also to the bearing frame or support $c$.

As mentioned at the commencement of the specification, the circular knife may be ground on the slicing-machine itself. Its spherical form lends itself excellently to this, and for this object an emery-stone or the like is fixed on the table B and is then passed, with the moving table B, along the rapidly-rotating knife, thus sharpening the latter.

If, owing to repeated sharpenings, the cutting edge $c'$ lies too far from the front edge of the table, the table, with the slide-tracks $a$, may be again moved closer up. For this object adjustable connections $a'$ for the slide-tracks $a$ to the table-frame are employed, Figs. 1 and 2ª.

The transverse movement of the table B is effected in the following manner: A pin $e$ is adjustably mounted in a slot $e'$ in the side of one bevel-wheel S', Figs. 3 and 3ª. This pin engages in a slot $g$ in a lever G, which is revolubly mounted in the table-frame underneath the bevel-wheel and the upper end of which is pivotally connected, by means of a link H, with the under side of the table. The lever is thus oscillated by said pin $e$ and imparts an alternating movement to the table. The movement outward of the pin $e$ determines the length of the reciprocating movement of the table. The position of the pivot $g'$ for the said lever G is selected as regards that of the bevel-wheel S' in such a way that the leverage of the pin $e$ on the forward movement is considerably larger than that on the return movement. The forward movement— that is to say, the one during which the knife cuts—is therefore slower and the return movement, in which no work is done, is rapidly effected. Fig. 3 shows in dotted lines the other endmost position of the table B, while the one shown in Fig. 3ª, with the pin $e$ in the slot $e'$ of the bevel-wheel S', corresponds to the greatest movement of the lever G. In case small slices are to be cut, for which the length of movement of the table only requires to be small, the pin $e$ is fixed in the other corner of the slot $e'$ in the bevel-wheel to shorten the movement of the table, and in this manner no time is lost.

The surface of the table is ribbed or corrugated on the upper side to about half its length, as shown in Figs. 1 and 2, and the remaining part is covered with an adjustable plate N, which is carried between dovetail bars $h$, arranged on the side edges of the table. On the front edge of the plate N a clamp for the polony or the like is arranged. This consists of two vertical toothed bars $n$ $n'$, which are connected by means of a clamp-iron P, having a handle $p$, Figs. 2 and 5. The one toothed bar $n$ is fixed. The other bar $n'$—that is to say, the one on the hand-crank side of the table—is pivotally connected with the plate N and is always pressed outward by means of a spring $n^2$. The clamp-iron P has preferably a ⌒ profile, which produces a better clamping of the polony or the like.

For cutting slices of meat the adjustable plate N is drawn entirely back and the polony or piece of meat is clamped thereon by the clamp-iron P being engaged in one of the teeth of the toothed bar $n$, the handle $p$ being then pressed down and allowed to spring into engagement with one of the teeth of the other toothed bar $n'$. The clamp-iron thus holds the polony at one end, with the other end lying at the front edge of the table B. By the table being provided with sharp ridges or corrugations $m$ and the "knife," so to speak, pressing down the polony while cutting it, (it being moved by the movable table against the circular knife) the polony cannot slip on the table, although it is merely held at the one end of the adjustable plate N.

As mentioned at the commencement of the specification, after each cut—that is to say, on the return movement of the table—the polony or the like is automatically moved forward to the thickness of one slice. This adjustment is effected in the following manner: A screwed rod V is arranged in the center line beneath the table B. Above this rod an elongated opening V is provided in the table, Figs. 1 and 5. A nut is connected with the adjustable plate N, which nut consists of two parts, the upper one, $t$, of which is firmly connected with the plate N and has no thread and therefore slips over or along the bar V, while the lower part of the nut, $t'$, which is hinged to the other part $t$, has, however, a thread, (see Fig. 5, which represents a vertical cross-section of the table through nuts $t$ $t'$.) If then this part be pressed against the screwed bar V, this thread will engage with the thread thereon, and upon the rotation of the bar the plate N will be moved forward. If, however, the threaded part $t'$ of the nut be released from the bar V, the plate N may be freely adjusted or displaced.

The throwing into engagement of the nut with the screw-bar V is effected in the following manner: The under part of the nut $t'$ is prolonged to the one side, and this end $t^2$ slides in a slotted bar $r$, which extends along the entire extent of the elongated opening $v$ and is provided with arms, so as to turn on pins $r'$ $r^2$ on the table, Figs. 5 and $5^a$, like a ball, which latter figure represents a vertical longitudinal section of the table, the bar $r$ being in elevation, as seen from the right. One end arm of the slotted bar is prolonged to the outside of the table and here formed into a counterweight W. In consequence of this counterweight W the slotted bar $r$ is always raised, and thereby the under part of the nut is pressed against the screwed rod V, so that then the adjustable plate N is connected therewith. If, however, the counterweight W be raised, this connection will be released and the plate N may at once assume any desired position on the table B without revolving the screwed rod V. Fig. 5 shows in dotted lines the highest position of the counterweight and the lowest of the lower part $t'$ of the nut, the latter being thus released from the screwed bar V. It is evident that while the plate N is on the table its connection with the screwed bar may be at any time released by lifting the counterweight, and thus pressing down the bar V.

The rotation of the screwed bar V and the pushing forward of the plate N, with the polony or the like, is effected in the following way by the backward movement of the table itself: On the end of this bar, outside the table, a ratchet-wheel $w$ is firmly mounted and an elbow-lever $z$ $z'$ loosely mounted thereon. The one end $z$ of the lever bears, by means of a roller $i$, on an inclined plane or cam $b$, which is adjustably connected with the table-frame. On the other end $z'$ of the lever a pawl $z^2$ is pivotally mounted to engage the ratchet $w$, said pawl having a handle $z^3$ to allow of its being disengaged. A second roller $i^2$ is mounted on the pivot of the pawl to run on the table-frame as soon as the first roller $i$ has traveled off the cam $f$, and any dropping down of the lever-arm is thus prevented.

The inclined plane or cam is adjustable vertically and horizontally, the screw-pin $f'$, by which it is fixed, being adjustable in a horizontal elongated slot $f^2$ in the table-frame and itself projecting through a vertical elongated slot $f^3$ in the cam $f$ and being screwed to the same by means of a nut, Fig. 6.

On the forward movement of the table the roller $i$ runs down the inclined plane or cam and then the other roller $i^2$ runs along the table. The lever-arm $z'$ then descends and the pawl $z^2$ slides over a number of teeth of the stationary ratchet-wheel $w$. On the return movement of the table this lever-arm, however, is again raised until the roller $i$ has reached the highest point of the inclined plane $f$, and the pawl $z^2$ in the meantime rotates the ratchet $w$ and therewith the screwed rod V, so that the plate is pushed forward to the thickness of a slice of meat. This operation is repeated at each to-and-fro movement of the table, so that gradually the polony or the like is cut into slices. By placing the cam $f$ higher a greater displacement of the plate N and thicker slices of meat may be obtained, while if a shorter transverse movement of the table at the bevel-wheel S' is to be obtained the cam or plane $f$ must be correspondingly adjusted to the right in the slot $f^2$.

As hereinbefore mentioned, the polony or the like may also be clamped obliquely or diagonally on the table and then the machine will cut, for instance, longer slices from a polony. For this purpose an oblique table B, Fig. 4, may be utilized. This arrangement requires only another connection of the nut on the plate N—namely, by the upper part $t$ of the nut being formed as a round pin or stud $t^3$ to move between two bars or ridges $o$ on the plate N. This arrangement is necessary when the screwed bar V is placed at right angles, and the opening $v$ must then be made much broader. Fig. 4 shows these positions of the plate N in the table B, allowing the position of the nut between the bars $o$ to be clearly seen. The arrangement of the other parts requires no alteration.

I declare that what I claim is—

1. In a machine for slicing German sausages and the like meat goods: the combination with a stationary but revoluble circular knife and means for rotating same, of a movable table, means for adjusting the length of travel of the table, means for clamping to said table the meat or the like to be cut, and means for reciprocating said table transversely to the axis of said knife, substantially as hereinbefore described.

2. In a machine for slicing German sausages and the like meat goods: the combination with a stationary but revoluble circular knife and means for rotating same, of a movable table, means for adjusting the length of travel of the table, means for reciprocating said table transversely to the axis of said knife, an adjustable plate covering a portion of said table and extending to said grooves, means for clamping the meat or the like to said plate, and means for automatically moving said plate toward the knife after each slice or cut, substantially as hereinbefore described.

3. A machine for slicing German sausages and the like meat goods, comprising a stationary but revoluble circular knife having a spherical or dished form; means for rotating said knife; a movable table; means for reciprocating said table transversely to the axis of the said knife; an adjustable plate on said table; means for clamping the meat or the like to said plate; means for automatically moving said plate toward the knife after each slice or cut; and means for adjusting the length of travel of the table; in combination, substantially as hereinbefore described.

4. In a slicing-machine of the kind described: the means for reciprocating the table in adjustable slide-tracks on the table-frame transversely to the axis of the circular knife, consisting of the combination with one of the gear-wheels of the machine of a lever having one end pivotally connected to the frame, and its other end linked to the table, said gear-wheel having a pin to engage in a slot formed in said lever in such a way that the table is reciprocated with a slow forward movement but with a quick return, substantially as hereinbefore described.

5. In a slicing-machine of the kind described: the means for reciprocating the table in adjustable slide-tracks on the table-frame transversely to the axis of the circular knife, consisting of the combination with one of the gear-wheels of the machine, of a lever having one end pivotally connected to the frame, and its other end linked to the table, said gear-wheel having a pin to engage in a slot formed in said lever in such a way that by the shifting of said pin in said slot the table is reciprocated with a slow forward movement but with a quick return, the said pin being adjustably mounted on the side of the gear-wheel to adapt it to set at a variable distance from the center, whereby the length of travel of the table may be adjusted, substantially as hereinbefore described.

6. In a slicing-machine of the kind described, the means for automatically moving forward the feed-plate after each slice comprising a threaded spindle arranged beneath the table and means for rotating said spindle, in combination with a nut formed of two parts pivotally connected with one another on the feed-plate, the upper part of the said nut being firmly connected with the plate and adapted to slip or travel over the threaded rod while the lower part is provided with a thread to engage said rod, and an arm or extension on said lower part engaging in a slotted bar which is pivotally mounted like a bail with a counterweight tending to press it normally upward to thus keep the two parts of the nut closed and in engagement with the screw-thread while permitting of an immediate release of the nut and therewith of the feed-plate from the threaded spindle, substantially as hereinbefore described.

7. In a slicing-machine of the kind described, the mechanism for the rotation of the threaded spindle after each slice or cut so as to move forward the feed-table; consisting of a ratchet-wheel fixed on the threaded spindle, in combination with a double lever, the one arm of which carries a pawl to engage the ratchet-wheel, and the other arm a roller bearing on an inclined plane or cam whereby on the return movement of the table the said ratchet-wheel and therewith the threaded spindle are rotated by the pawl to move the feed-plate with the meat or the like, the said inclined plane or cam being so mounted on the machine-frame as to be laterally and vertically adjustable in order that it may be set for thicker slices of meat, or to suit the length of travel of the table, substantially as hereinbefore described.

8. In a slicing-machine of the kind described, the combination of a table, a feed-plate obliquely mounted on said table, means for automatically moving said feed-plate obliquely toward the knife or cutter after each slice or cut, and means for adjusting the length of travel of the said table, substantially as described.

In testimony that I claim the foregoing as my invention I have signed my name, in presence of two witnesses, this 22d day of March, 1898.

WILHELMUS ADRIANUS VAN BERKEL.

Witnesses:
PETRUS VAN BERKEL,
JUSTUS WILHELMUS SCHWEGMAN.